(12) United States Patent
Kuo et al.

(10) Patent No.: US 9,586,741 B2
(45) Date of Patent: Mar. 7, 2017

(54) SAFE PACKAGE OF MICRO BATTERY WITH USED BATTERY RECYCLING FUNCTION

(71) Applicants: Peng-Yi Kuo, New Taipei (TW); Wang Ting Hung, New Taipei (TW); Shu Min Lin, New Taipei (TW)

(72) Inventors: Peng-Yi Kuo, New Taipei (TW); Wang Ting Hung, New Taipei (TW); Shu Min Lin, New Taipei (TW)

(73) Assignee: PONI GREENTEK CO., LTD., New Taipei (TW)

( * ) Notice: Subject to any disclaimer, the term of this patent is extended or adjusted under 35 U.S.C. 154(b) by 221 days.

(21) Appl. No.: 14/612,150

(22) Filed: Feb. 2, 2015

(65) Prior Publication Data

US 2016/0226039 A1    Aug. 4, 2016

(51) Int. Cl.
| | | |
|---|---|---|
| *B65D 85/00* | (2006.01) | |
| *B65D 75/22* | (2006.01) | |
| *B65D 75/58* | (2006.01) | |
| *B65D 83/04* | (2006.01) | |
| *H01M 2/02* | (2006.01) | |

(52) U.S. Cl.
CPC ............ *B65D 75/22* (2013.01); *B65D 75/58* (2013.01); *B65D 83/0409* (2013.01); *B65D 2585/88* (2013.01); *H01M 2/0222* (2013.01)

(58) Field of Classification Search
CPC . B65D 83/02; B65D 83/0454; B65D 2585/88
USPC ............. 206/704; 221/82, 66; 220/212, 229
See application file for complete search history.

*Primary Examiner* — Anthony Stashick
*Assistant Examiner* — James M Van Buskirk

(57) ABSTRACT

A safe package of micro battery with used battery recycling function, which can prevent the children from taking the micro battery easily and swallowed by mistake, comprising a lower cover plate, a folding portion, and an upper cover plate, the same side edge of said lower cover plate and said upper cover plate respectively connected with corresponding side of folding portion; said folding portion configure to fold the upper cover plate in the lower cover plate for fixing integrally and matched mutually; the lower cover plate including a concave part, a insertion slot, an exit slot, and two projecting parts; the upper cover plate including a insertion slit, two sides slits, and an exit slit thereby taking the new micro battery and recycled the used battery via double hands.

7 Claims, 8 Drawing Sheets

US 9,586,741 B2

SAFE PACKAGE OF MICRO BATTERY WITH USED BATTERY RECYCLING FUNCTION

FIELD OF THE INVENTION

The present invention relates to a safe package of micro battery, particularly to a safe package of micro battery with used battery recycling function.

BACKGROUND OF THE INVENTION

At present, a safe package for micro battery is used as a structure to prevent the children from easily opened, however it is only for whole new package without being opened, but the children are still likely to get the used battery and swallow by mistake if the battery is not properly processed or recycled.

In view of this problem, the prior art need to be further improved.

SUMMARY OF INVENTION

The objection of the present invention is provide a safe package of micro battery with used battery recycling function to prevent the children from easily getting the used battery.

The improved scheme of present invention is to provide a safe package of micro battery with used battery recycling function comprising said safe package of micro battery, including a lower cover plate, a folding portion, and an upper cover plate, the same side edge of said lower cover plate and said upper cover plate respectively connected with corresponding side of folding portion; said folding portion configured to fold the upper cover plate in the lower cover plate for fixing integrally and matched mutually, a space formed between a lower surface of the upper cover plate and a top surface of the lower cover plate; the lower cover plate including a concave part arranged in the center part thereof, and configured to receive said micro battery; a insertion slot arranged and communicated in one side of the concave part; an exit slot arranged and communicated in the other side of the concave part, and corresponding to the insertion slot; two projecting parts respectively disposed at two sides away from the insertion slot and the exit slot; the upper cover plate including a insertion slit arranged therein corresponding position between the concave part and the battery insertion slot; two sides slits corresponding to two sides of the insertion slot and connected to the insertion slit in one end thereof to form a safe plate configured to press down for insertion of the micro battery; an exit slit arranged therein corresponding position between the concave part and the exit slot.

Wherein both the lower cover plate and the upper cover plate are the same size, and is preferably in form of rectangular shape; wherein the folding portion is defined as a narrow slice body with bendable function, a width of said narrow slice body acing narrower than the one of the lower cover plate and the upper cover plate.

Wherein the safe package of micro battery is made by one of the following: PET, PP, PE, PVC.

Wherein the width of said insertion slot in a border between the insertion slot and the concave part is at least one third in diameter of the concave cart, and the depth of the battery insertion slot is the same as the concave part.

Wherein the exit slot is formed in an arc slope, and the depth in connection with the concave part is at least one fourth of depth in the concave part.

Wherein the length of the insertion slit and the exit slit is longer than or equal to the (diameter of the concave part.

Wherein the concave part is provided with a flat cone-shaped body in the circle center thereon configured to squeeze out the micro battery therefrom.

According to the above mentioned improved scheme, the utility model has the main advantage that:

1. By applying the insertion slot, the exit slot, the space the insertion slit, and the exit slit, the user not only need to take a new battery out of the safe package by insertion of used battery, but also operate it by double lands, thus preventing the children from taking cattery out of package and getting it easily.

2. The device is generally formed by the upper cover plate, the folding portion, and the lower cover plate, the structure is simple and easy to produce that can save more production cost and manufacture time.

DETAILED DESCRIPTION OF THE PREFERRED EMBODIMENTS

Figure 1:
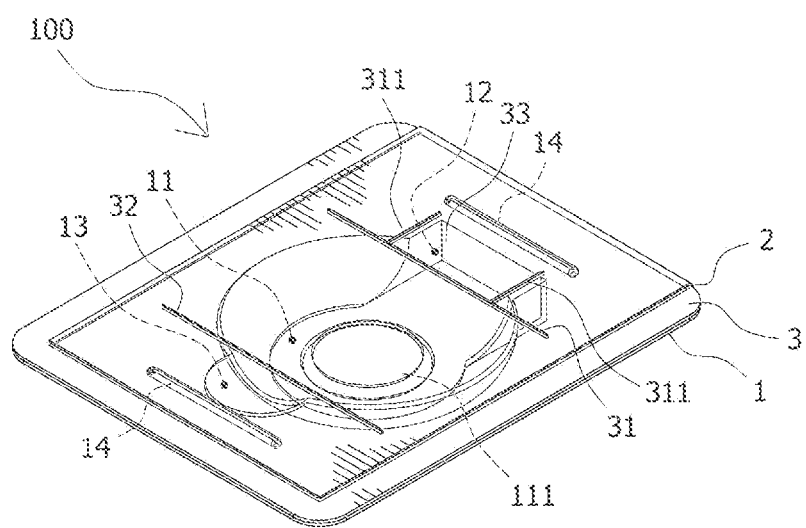
FIG. 1 is a perspective schematic view of the present invention.
Figure 2:
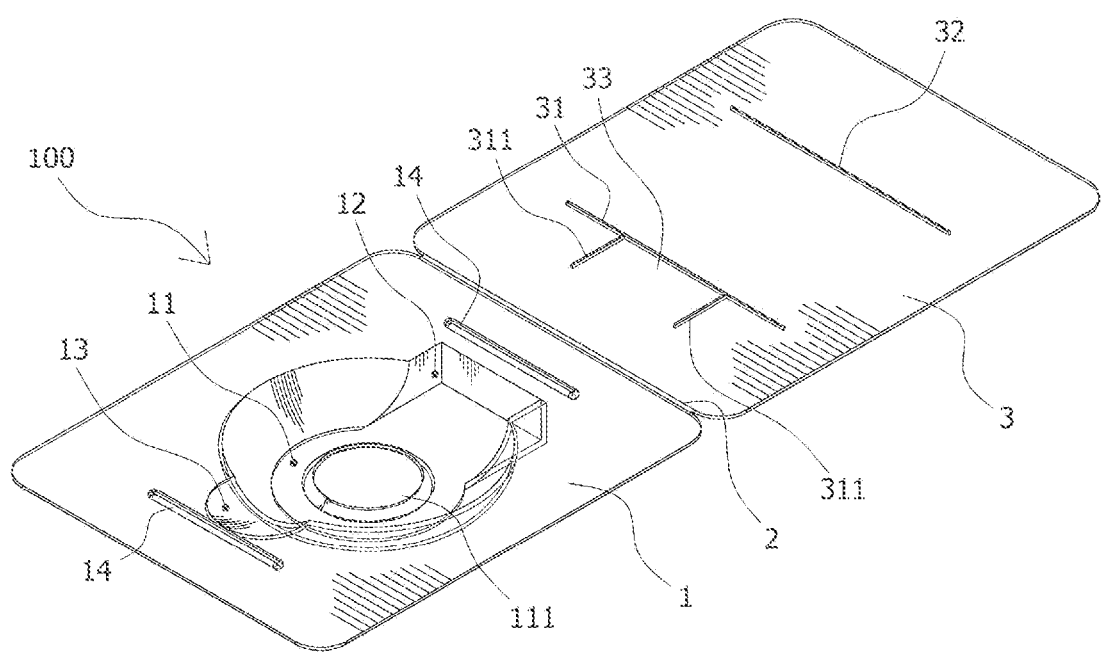
FIG. 2 is an exploded view thereof.

The invention will now be described in connection with certain preferred embodiments with reference to the above illustrative figures so that it may be more fully understood.

As shown in FIG. 1 to FIG. 7, a safe package of micro battery with used battery recycling function comprising said safe package (100) of micro battery, including a lower cover plate (1), a folding portion (2), and on upper cover plate (3), the same side edge of said lower cover (1) and said upper cover plate (3) respectively connected with corresponding side of folding portion (2); said folding portion configured to fold the upper cover plate (3) in the lower cover plate (1) for fixing integrally and matched mutually; a space (4) formed between a lower surface of the upper cover plate (3) and a top surface of the lower cover plate (1);

the lower cover plate (1) inducing a concave part (11) arranged in the center part thereof, and configured to receive said micro battery (200); a insertion slot (12) arranged and communicated in one side of the concave part (11); an exit slot (13) arranged and communicated in the other side of the concave part (11), and corresponding to the insertion slot (12); two projecting ports (14) respectively disposed at two sides away from the insertion slot (12) and the exit slot (13);

the upper cover plate (3) including a insertion slit (31) arranged therein corresponding position between the concave part (11) and the battery insertion slot (12); two sides slits (311) corresponding to two sides of the insertion slot (12) and connected to the insertion slit (31) in one end thereof to form a safe p ate (33) configured to press down for insertion of the micro battery; an exit slit (32) arranged therein corresponding position between the concave part (11) and the exit slot (13).

Wherein the folding portion (2) is defined as a narrow slice body with bendable function, a width of said narrow slice body being narrower than the one of the lower cover plate (1) and the upper cover plate (3).

The micro battery (200) is categorized as new micro battery (200a) and used micro battery (200b) for the detailed description, if there is no specific for new or used one in the following description, it is the micro battery (200).

By applying the above mentioned devices, the user can take new micro battery (200a) Out of the safe package (100) by insertion of old micro battery (200b) through double hands operation, thus, we don't need to worry how to deal with the used micro battery (200b), and the children also are not easy to get the new or used battery.

Figure 7:
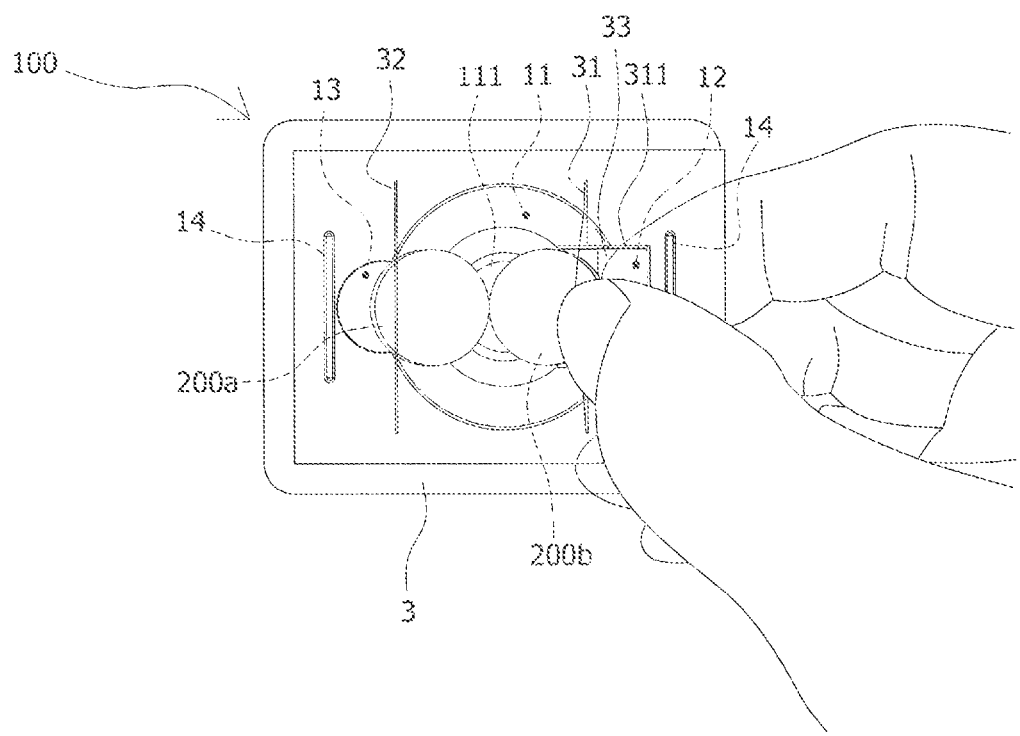
FIG. 7 is a perspective schematic view thereof showing security function.
Figure 7:
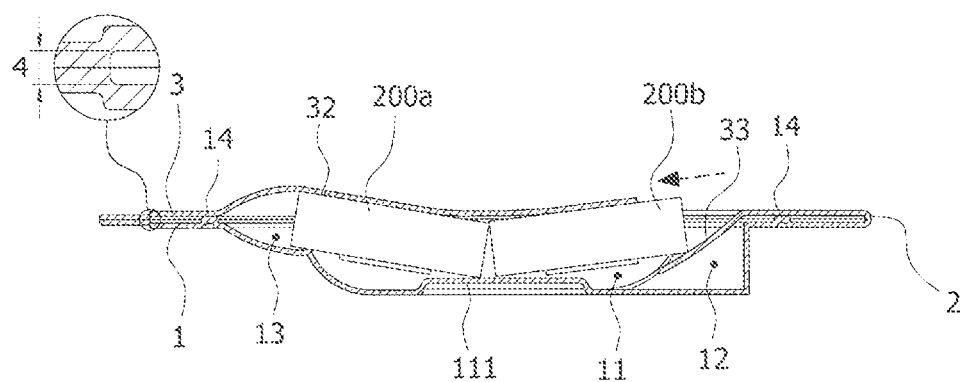

Secondly, by, applying the insertion slot (12), the exit slot (13), the space (4), the insertion slit (31), the exit slit (32), and the safe plate (33), if the operation to take the micro battery (200) is not correct, it, is easy to get stuck in the space (4), thus preventing the micro battery (200) from failing out of the safe package (100) as showing in FIG. 7.

Figure 3:
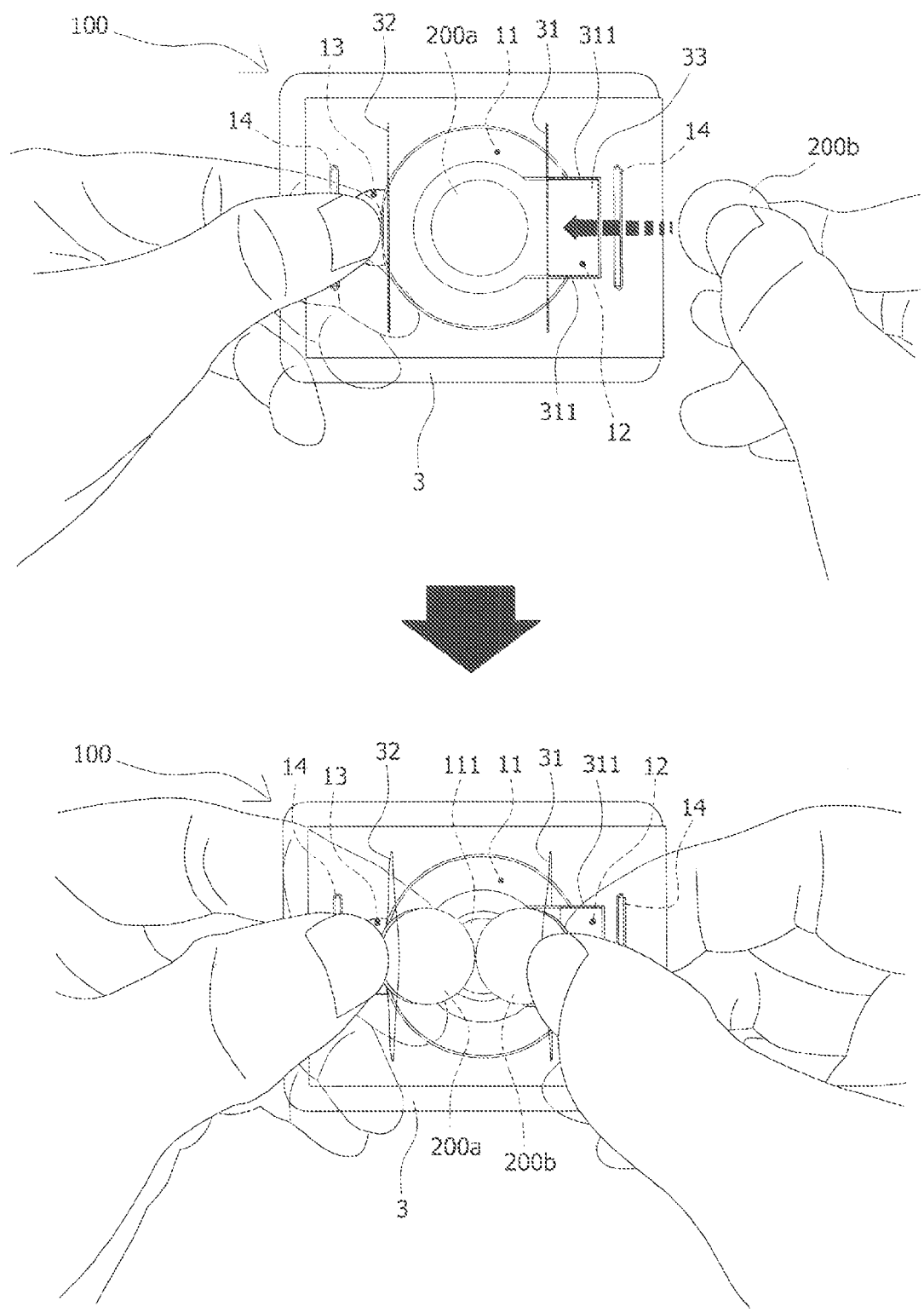
FIG. 3 and FIG. 4 are implementation views thereof.

The operation steps are as followings:

Step 1: properly press the exit slit (32) corresponding to the exit slot (13) with one finger to open the exit slit (32) as shown in FIG. 3.

Figure 4:
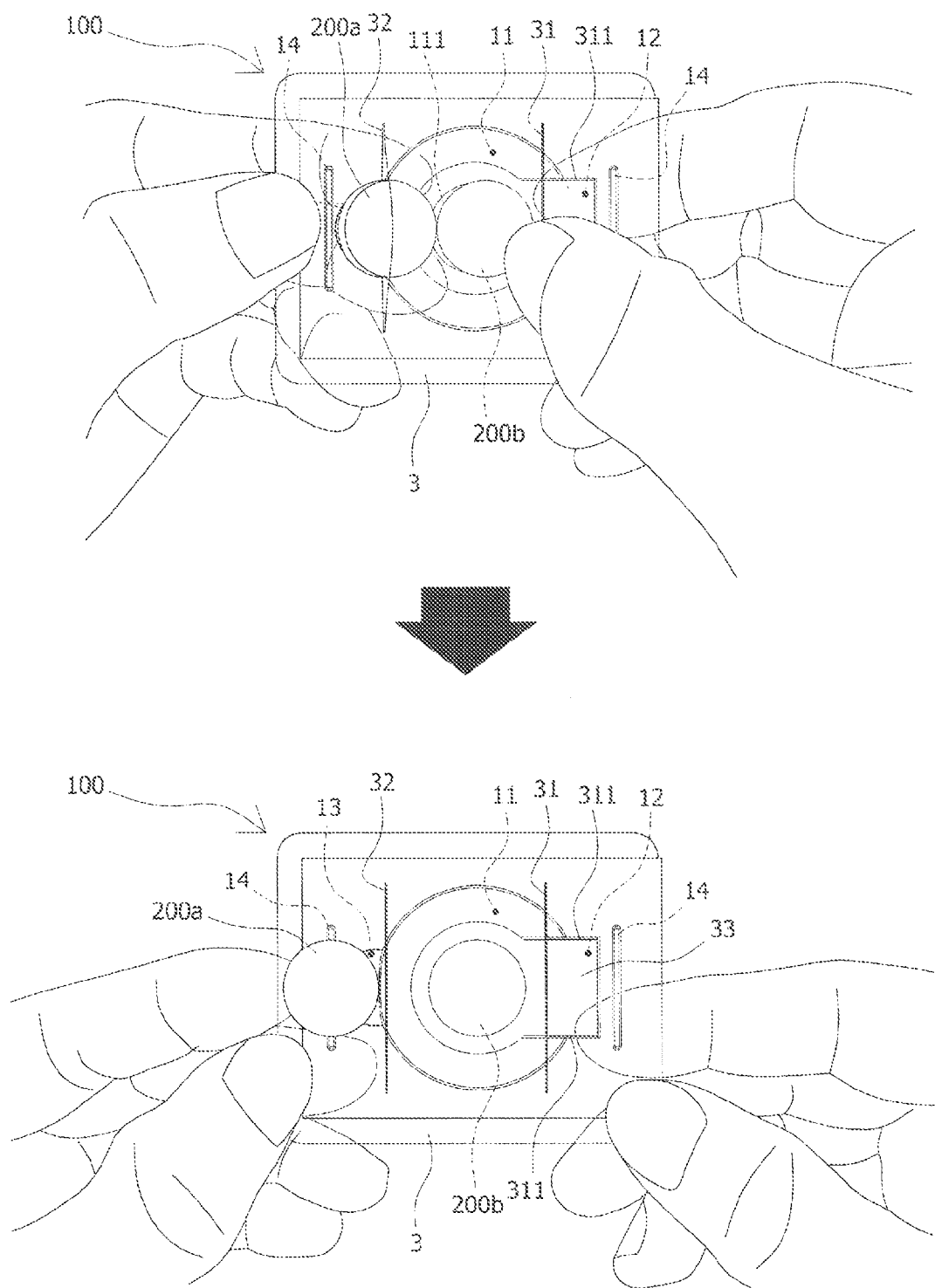
Figure 5:
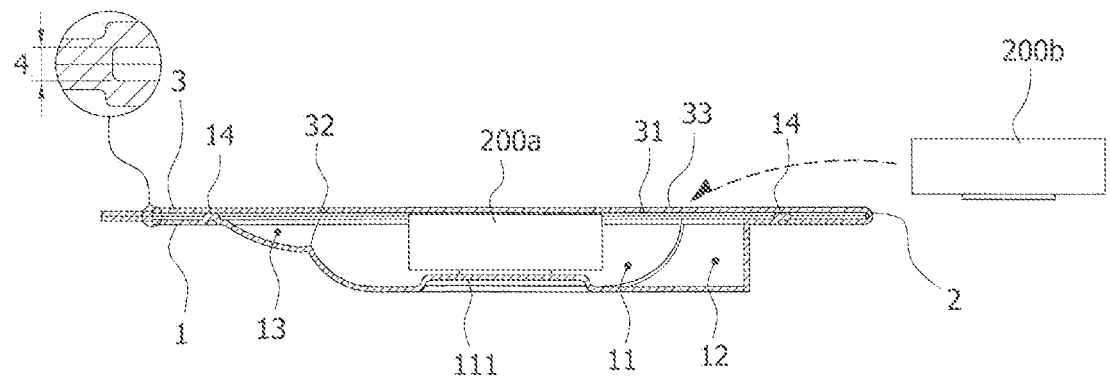
FIG. 5 and FIG. 6 are sectional implementation views thereof.
Figure 5:
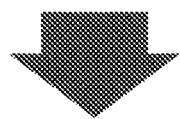
Figure 5:
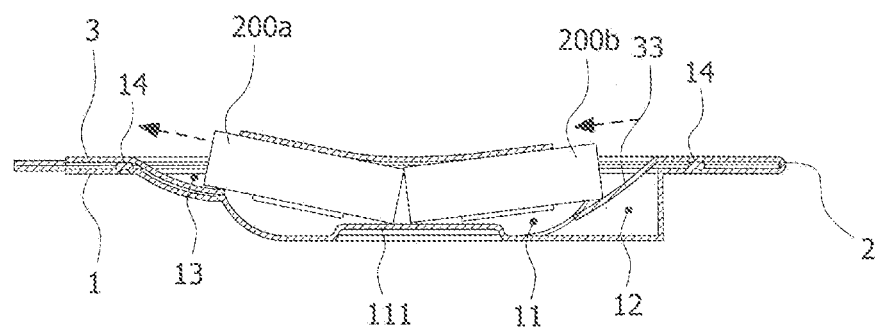
Figure 6:
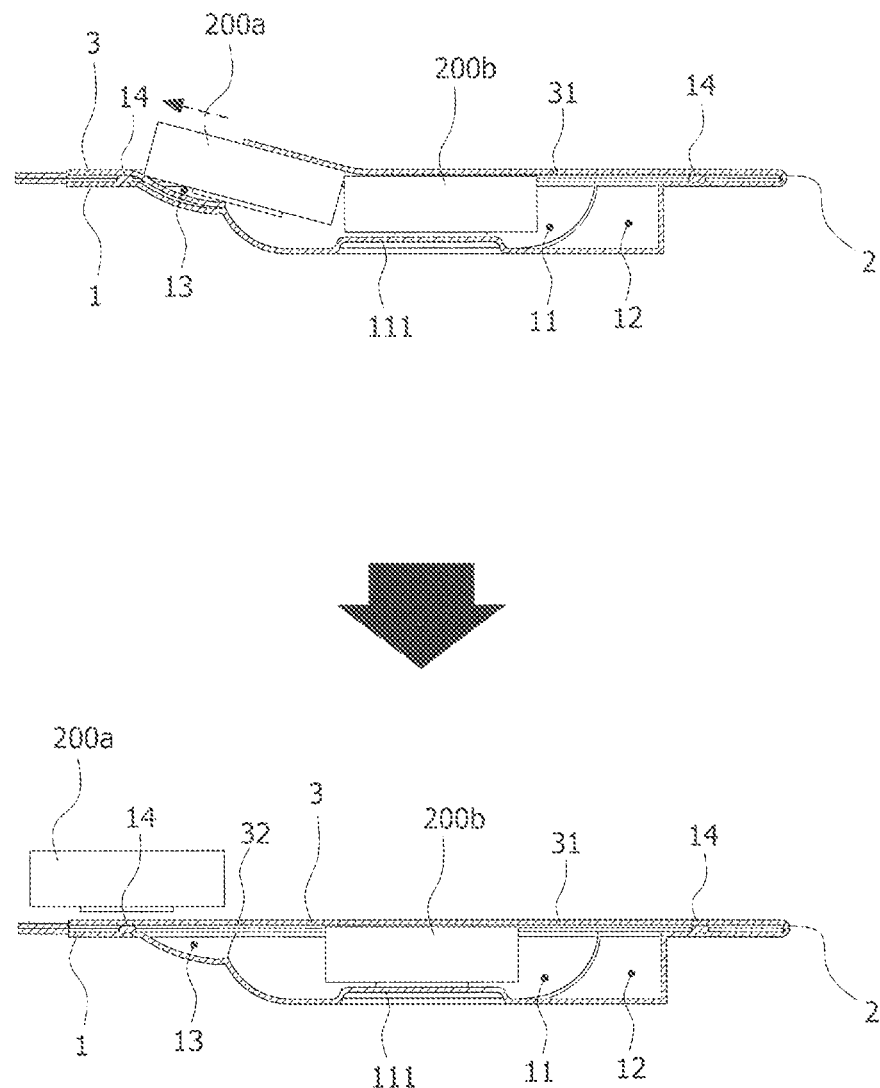

Step 2: take the used micro battery (200b) with the other hand to press on and push against the safe plate (33) for making thereof sunken in the insertion slot (12) as shown in FIG. 5 below, thereby facilitating the used micro battery (200b) inserting into the concave part (11) and squeezing out the new micro battery (200a) from the exit slit (32) through the exit slot (13) as shown in FIG. 4 above and FIG. 6 above.

Step 3: release the finger from exit slit (32) after the used micro battery (200b) entered all the way to the concave part (11), thus achieving a recycling purpose to prevent the children from taking the used micro battery (200b) easily, only if the safe package (100) has been broken by took or use the same approach described above.

Wherein the safe package (100) of the micro battery is made by one of the following: PET, PP, PE or PVC. Those polymer materials are easy to produce and durable to protect the micro battery (200). In addition, the materials are facilitated jointing the folding portion (2) by hot melt connection or adhesive bonding.

wherein the width of said insertion slot (12) in a border between the insertion slot (12) and the concave part (11) is at least one third in diameter of the concave part (11) and the depth of the battery insertion slot (12) is the same as the concave part (11); wherein the exit slot (13) is formed in an arc slope, and the depth in connection with the concave part (11) is at least one fourth of depth in the concave part (11); wherein the length of the insertion slit (31) and the exit slit (32) is longer than or equal to the diameter of the concave part (11); wherein the concave part (11) is provided with a flat cone-shaped body (111) in the circle center thereon configured to squeeze out the micro battery therefrom by lever principle, thereby facilitated insertion of the used micro battery (200b) and taking the new micro battery (200a) out of safe package (100).

Figure 8:
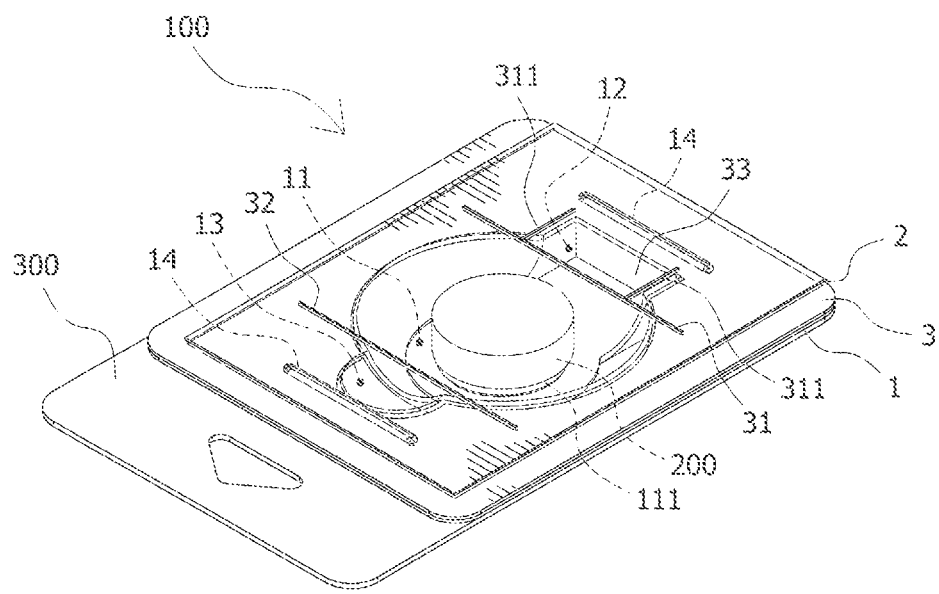
FIG. 8 is a schematic view showing the present invention applied with hang tag.

The present invention can be applied with a hang tag (300) as shown in FIG. 8.

It will be evident to those skilled in the art that the invention is not limited to the details of the foregoing illustrated embodiments and that the present invention may be embodied in other specific forms without departing from the spirit or essential attributes thereof. The present embodiments are therefore to be considered in all respects as illustrative and not restrictive, the scope of the invention being indicated by the appended claims rather than by the foregoing description, and all changes which come within the meaning and range of equivalency of the claims are therefore intended to be embraced therein.

We claim:

1. A safe package of micro battery w used battery recycling function comprising said safe package (100) of micro battery, including
    a lower cover plate (1),
    a folding portion (2), and
    an upper cover plate (3),
    the same side edge of said lower cover plate (1) and said upper cover plate (3) respectively connected with corresponding sides of the folding portion (2); said folding portion configured to fold the upper cover plate (3) in the lower cover plate (1) for fixing integrally and matched mutually; a space (4) formed between a lower surface of the upper cover plate (3) and a top surface of the lower cover plate (1);
    the lower cover plate (1) including a concave part (11) arranged in the center part thereof, and configured to receive said micro battery 200; a insertion slot (12) arranged and communicated in one nice of the concave part (11); an exit slot (13) arranged and communicated in the other side of the concave part (11), and corresponding to the insertion slot (12); two protecting parts (14) respectively disposed at two sides away from the insertion slot (12) and the exit slot (13);
    the upper cover plate (3) including a insertion slit (31) arranged therein corresponding position between the concave part (11) and the battery insertion slot (12); two sides slits (311) corresponding to two sides of the insertion slot (12) and connected to the insertion slit (31) in one end thereof to form a safe plate (33) configured to press down for insertion of the micro battery; an exit slit (32) arranged therein corresponding position between the concave part (11) and the exit slot (13).

2. The device of claim 1, wherein both the lower cover plate (1) and the upper cover plate (3) are the same size, and is preferably in form of rectangular shape; wherein the folding portion (2) is defined as a narrow slice body with bendable function, a width of said narrow slice body being narrower than the one of the lower cover plate (1) and the upper cover plate (3).

3. The device of claim 1, wherein the safe package (100) of the micro battery is made by one of the following: PET, PP, PE, PVC.

4. The device of claim 1, wherein the width of said insertion slot (12) in a border between the insertion slot (12) and the concave part (11) is at least one third in diameter of the concave part (11), and the depth of the battery insertion slot (12) is the same as the concave part (11).

5. The device of claim 1, wherein the exit slot (13) is formed in an arc slope, and the depth in connection with the concave part (11) is at least one fourth of depth in the concave part (11).

6. The device of claim 1, wherein the length of the insertion slit (31) and the exit slit (32) is longer than or equal to the diameter of the concave part (11).

7. The device of claim 1, wherein the concave part (11) is provided with a flat cone-shaped body (111) in the circle center thereon configured to squeeze out the micro battery therefrom by lever principle.

\* \* \* \* \*